United States Patent [19]

Jarzombek et al.

[11] Patent Number: 4,571,416

[45] Date of Patent: Feb. 18, 1986

[54] LIQUID COLORANT/ADDITIVE CONCENTRATE FOR PLASTICS

[75] Inventors: Richard E. Jarzombek, Munster; Raymond J. Moeller, Cedar Lake, both of Ind.

[73] Assignee: Bee Chemical Co., Lansing, Ill.

[21] Appl. No.: 693,235

[22] Filed: Jan. 22, 1985

Related U.S. Application Data

[63] Continuation of Ser. No. 544,370, Oct. 21, 1983, abandoned.

[51] Int. Cl.$^4$ ................................................ C08K 5/01
[52] U.S. Cl. .................................... 524/474; 524/577; 524/579; 524/560
[58] Field of Search ................. 524/579, 474, 577, 560

[56] References Cited

U.S. PATENT DOCUMENTS

| | | | |
|---|---|---|---|
| 2,154,089 | 4/1939 | Hillman | 524/579 |
| 2,176,219 | 10/1939 | Marling et al. | |
| 2,217,322 | 3/1943 | Russel | 524/474 |
| 2,639,275 | 5/1953 | Vickers | 524/579 |
| 3,185,655 | 5/1965 | Dersnah et al. | |
| 3,409,585 | 11/1968 | Hagemeyer, Jr. et al. | 524/579 |
| 3,615,754 | 10/1971 | Gotshall | |
| 3,950,288 | 4/1976 | Herbst et al. | |
| 3,956,008 | 5/1976 | Knepper et al. | |
| 3,988,285 | 10/1976 | De Vrieze | |
| 4,167,503 | 9/1979 | Cipriani | |
| 4,168,180 | 9/1979 | Peabody | 524/577 |
| 4,329,264 | 5/1982 | Muller | |

FOREIGN PATENT DOCUMENTS

| | | | |
|---|---|---|---|
| 1288785 | 2/1969 | Fed. Rep. of Germany | 524/579 |
| 2509629 | 9/1975 | Fed. Rep. of Germany | 524/474 |
| 819706 | 9/1959 | United Kingdom | 524/579 |

Primary Examiner—Paul R. Michl
Assistant Examiner—N. Sarofim
Attorney, Agent, or Firm—Willian Brinks Olds Hofer Gilson & Lione Ltd.

[57] ABSTRACT

A polyolefin compatable liquid colorant/additive concentrate for molding plastics. The colorants and additives are conventional pigments and additives. The vehicle contains (A) a low molecular weight addition polymer, such as a polybutene, a polystyrene, a poly alpha-methyl styrene/vinyl toluene copolymer, or an acrylic polymer or copolymer, and (B) an essentially non-volatile solvent for the low molecular weight addition polymer which has a boiling point of at least about 450° F. and which is compatable with the resin to be colored. The liquid concentrate has a Brookfield viscosity between about 1000 and 40,000. The colorant concentrate produces uniform color finished products, without visible streaks or specks. It also eliminates screw slippage.

8 Claims, No Drawings

LIQUID COLORANT/ADDITIVE CONCENTRATE FOR PLASTICS

This application is a continuation of application Ser. No. 544,370, filed 10/21/83, now abandoned.

BACKGROUND OF THE INVENTION

The present invention relates to liquid additive concentrates for thermoplastics, especially to liquid colorant concentrates which are compatable both with polyolefin resins and with a wide variety of other thermoplastic resins.

The traditional procedure for coloring plastic resins, or for introducing additives into a plastic, is to tumble blend the plastic resin with a solid colorant or additive concentrate, such as a coloring powder or polymer pellets containing a high concentration of a colorant or other additive. The blended material is then fed into the extruder or molding machine, where the resin and the additive are plastized and the colorant or additive is incorporated into the molten plastic.

While generally effective, this method had a number of drawbacks. In many cases, the colorant or additive concentrate does not uniformly mix with the plastic resin, or it does not disperse uniformly during molding. In some cases, it tends to segregate from the resin during pre-molding handling because of particle size or specific gravity differences. Any such non-uniformity of distribution tends to produce unacceptable finished products, either due to non-uniform color, such as color specks or streaks, or to unacceptable mechanical properties due to concentrations of colorant or additive in the finished product. In addition, the use of polymer pellet concentrates requires a molder to maintain a large inventory of colorant pellets for each different color and resin type used in his plant.

In recent years, liquid colorants have been developed in an effort to overcome the disadvantages of the traditional solid colorants. Being liquids, these colorants may be accurately metered directly into the molding machine or extruder by in-line metering systems, which help overcome many of the disadvantages of solid colorants.

Previous liquid colorants have been based on surfactants and wetting agents. E.g., U.S. Pat. No. 4,167,503 to Cipriani and U.S. Pat. No. 3,956,008 to Knepper, et al. The surfactant based vehicles in these colorants provide an excellent pigment dispersion media and allow relatively high pigment loadings, at viscosities suitable for use in standard in-line metering equipment.

These surfactant based colorant and additive systems normally work quite well in polar polymers. However, the surfactants used in these colorants are polar in nature and are incompatable with many plastics, most notably the polyolefins. This incompatability can cause poor mixing in the molder or extruder, resulting in non-uniform color and the presence of color defects, such as specks of colorant. These surfactant based liquid colorants also tend to produce "screw slippage" in the molding machine or extruder when used to color polyolefins and certain other plastics, especially at high colorant loadings. Moreover, incompatable vehicles have a tendency to exude, or spew, to the surface of the molded plastic.

Accordingly, there is a need for a non-surfactant based liquid colorant which is compatable with polyolefin resins while still possessing the other important characteristics of a good liquid colorant. For example, the vehicle for the colorant should be able to produce a stable dispersion with a wide variety of organic and inorganic pigments and dyes. It should be capable of retaining high pigment loadings, and should be stable at the temperatures normally encountered in plastics molding and extrusion equipment. The vehicle also should be compatable with a wide variety of commercial thermoplastic resins other than the polyolefins. The colorant should have a viscosity suitable for use in conventional in-line metering and blending equipment. It should not cause "screw slippage". It should produce uniform color products, without visible streaks or specks, and without impairing the mechanical properties of the finished product. The colorant also should be non-toxic and odor-free. Although principally intended for the preparation of liquid colorants, the vehicle should be capable of dispersing other standard additives for plastics, such as UV absorbers, antioxidants, blowing agents, and the like.

BRIEF DESCRIPTION OF THE INVENTION

The present invention relates to a liquid colorant and additive concentrate which is compatable with polyolefin resins, such as polyethylene and polypropylene, as well as with a wide variety of other commercial thermoplastic resins.

The liquid concentrate of the invention is a dispersion of a colorant and/or other additive in a non-surfactant based vehicle. This vehicle includes (A) a low molecular weight addition polymer, such as a low molecular weight polybutene, polystyrene, poly alphamethyl styrene/vinyl toluene copolymer, or an acrylic polymer or copolymer, and (B) an essentially non-volatile solvent for the low molecular weight addition polymer, such as a light mineral oil or a light hydrocarbon oil, which also is compatable with the polyolefin or other resin to be colored. As used herein, the term "non-volatile" means the that the solvent has a boiling point of at least about 450° F.

The dispersion of the invention normally contains from about 10 percent to about 90 percent by weight of the colorant and/or additive, with the balance being the vehicle. Normally, the dispersion contains from about 5 percent to about 50 percent by weight of the low molecular weight addition polymer and from about 5 percent to about 70 percent by weight of the non-volatile solvent. Advantageously, the addition polymer and the non-volatile solvent each comprise at least about 25 percent by weight of the vehicle.

The dispersion also may contain a dispersion aid, such as oleic acid, especially when the colorant is an inorganic pigment. When a dispersion aid is used, it normally comprises from about 0.5 to about 5 percent by weight of the concentrate.

The liquid concentrates of this invention have a Brookfield viscosity between about 1000 and about 40,000 centipoises when measured at room temperature, using a No. 4 spindle at 10 RPM. Preferably, the Brookfield viscosity of the concentrate is between about 10,000 and 30,000 centipoises.

The liquid concentrates of this invention are particularly useful as liquid colorants for polyolefin and other thermoplastic resins. The non-surfactant based vehicles used to formulate the concentrates are compatable with polyolefin resins, as well as with many other commercial thermoplastic resins.

The liquid colorant concentrates of the invention produce finished products having uniform color, without visible streaks, specks, or other color defects. They may be incorporated into polyolefin resins without causing screw slippage, even at high use levels. They do not impair the mechanical properties of the finished goods. In some cases, the colorants even increase throughputs by acting as a flow agent during molding.

Stable dispersions can be produced with a wide variety of inorganic and organic pigments and with dyes. High colorant loadings can be achieved, at acceptable (pumpable) viscosities. Colorant concentrates of the invention are non-toxic and odor-free and are stable at normal molding and extrusion temperatures.

Additional features and advantages of the invention will be apparent to those of ordinary skill in the art, particularly in light of the description of the preferred embodiments and the examples.

DESCRIPTION OF PREFERRED EMBODIMENTS

The low molecular weight addition polymers useful in this invention include low molecular weight polybutenes, polystyrenes, poly alpha-methyl styrene/vinyl toluene copolymers, and acrylic polymers and copolymers. Preferably, these low molecular weight polymers are low in color so as not to interfere with the pigment or colorant with which it is blended. As used herein, the term "low molecular weight" does not refer to any generally applicable molecular weight range, as the appropriate low molecular weight range will vary from polymer type to polymer type. Rather, the term is intended to refer to the ability of the polymer to be dissolved in a suitable amount of the non-volatile solvent, at a concentration which will result in a colorant/additive concentrate having a room temperature viscosity between about 1000 and about 40,000 centipoises.

The low molecular weight polybutenes useful in the practice of this invention generally have an average molecular weight between about 1000 and 3500. Preferred low molecular weight polybutenes have an average molecular weight between about 2000 and about 3000. A preferred polybutene is Amoco Chemicals H-1900, which is a water white polybutene having an average molecular weight of about 2300. Another preferred polybutene is Chevron No. 122, which has an average molecular weight of about 2500. Polybutenes having lower average molecular weights tend to produce low viscosity color concentrates which do not eliminate specking.

Preferred low molecular weight polystyrenes have an average molecular weight between about 300 and 1000. The preferred polystyrene resins are Piccolastic A 50 and A 75, available from Hercules. A preferred low molecular weight alpha-methyl styrene/vinyl toluene copolymer is Piccotex 100, also available from Hercules.

Suitable acrylic resins have an average molecular weight between about 5000 and 10,000. Such resins may, for example, be prepared from isobutyl methacrylate or 2-ethyl hexyl acrylate.

The preferred non-volatile solvents useful in this invention have boiling points of at least about 450° F. and room temperature viscosities below about 100 centipoises. The solvents must be capable of dissolving the low molecular weight addition polymer at a concentration which will result in a colorant/additive concentrate having the necessary viscosity. The solvent should be compatable with polyolefin resins, and it should have low color, odor, and reactivity.

The preferred non-volatile solvents include light hydrocarbon oils and light mineral oils. An example of the former is Magiesol M-52, a product of Magie Bros. Oil Co. This light hydrocarbon oil has a boiling point range of 508° F. to 580° F. and a viscosity of 22 centipoises. A preferred light mineral oil is Witco No. 40 mineral oil, a product of Witco Chemical. This oil has an initial boiling point of 471° F. and a viscosity of 54 centipoises. Other useful solvents including di-octyl adipate and di-isodecyl phthalate.

In a particularly preferred embodiment of the invention, the low molecular weight addition polymer is a polybutene having an average molecular weight between about 2100 and 2700, most preferably about 2300 to 2500, and the non-volatile solvent is a light hydrocarbon oil such as Magiesol M-52 or a light mineral oil such as Witco No. 40. In this preferred embodiment, the vehicle contains between about 35-65 percent by weight polybutene and between about 35-65 percent by weight of the solvent. Most preferably, the vehicle contains about equal amounts of the polybutene and the solvent.

A wide variety of colorants may be used in the liquid colorant concentrates of this invention. Suitable colorants include inorganic pigments such as titanium dioxide, iron oxide, chromium oxides, and the like, and organic colorants such as carbon black, phthalocyanines, quinacridones, and the like.

Non-colorant additives which may be used in this invention, either alone or in conjunction with a colorant, include blowing agents, UV stabilizers, heat stabilizers, antistatic agents, flame retardants, mold release or slip agents, lubricants, fillers and reinforcing materials, and the like.

The concentrates of the invention are typically prepared by dissolving the low molecular weight addition polymer in the non-volatile solvent at a temperature below about 40° C., preferably at room temperature, in a high speed disperser, such as those manufactured by Cowles or Hockmeyer. If a dispersion aid is employed, it usually is added to the solvent at this point. After the polymer is completely dissolved and the solution is homogeneous, the colorant is added under agitation and the mixture is dispersed at high speed until a uniform, stable dispersion is achieved.

The concentrates of this invention may be used to color or incorporate additives into a wide variety of plastics. For example, the polybutene containing concentrates of the invention are generally compatable with, and may be used with the following plastic resins: polyethylenes, polypropylenes, polystyrenes, acetal resins, polyvinylchlorides, and nylons. The polystyrene containing concentrates of the invention are generally compatable with, and may be used with, polyethylene, polypropylene, polystyrene, and acrylonitrite-butadiene-styrene resins.

The concentrates of this invention also may be used in a wide variety of molding or extrusion applications. For example, they may be used for injection and blow molding applications and in sheet and profile extrusion.

EXAMPLES

The invention is further illustrated by reference to the following non-limiting examples, wherein all parts and percentages are by weight, unless otherwise specified.

EXAMPLE 1

Nineteen (19) parts of Amoco Chemicals Indopol H-1900 polybutene (average molecular weight of about 2300) were dissolved, at room temperature, in 19 parts of Magiesol M-52, a light hydrocarbon oil with a boiling point range of 508°-580° F. available from Magie Bros. Oil Co. Two (2) parts of Emersol 213, an oleic acid available from Emery Industries, was added to the mixture. Sixty (60) parts of DuPont titanium oxide R-900 were added under agitation and the mixture was mixed at high speed for about 30 minutes, until a uniform, stable dispersion was achieved. The Brookfield viscosity of this color concentrate was 23,000 centipoises at room temperature, with a #4 spindle at 10 rpm.

One (1) part of this color concentrate was tumble blended with 99 parts of Shell polypropylene resin grade 5824S. This mixture was then placed in the hopper of a conventional laboratory scale injection molding unit and molded into ⅛ in. thick panels. No screw slippage was observed during the molding. The panels molded with this color concentrate had a uniform color, without visible specks or streaks of color concentrate.

EXAMPLE 2

One (1) part of the color concentrate of Example 1 was tumble blended with 99 parts of Arco polyethylene resin grade 7120, placed in the hopper of a conventional laboratory scale injection molding machine, and molded into ⅛ in. thick panels. No screw slippage was observed. The molded panels had a uniform color, without visible specks or streaks.

EXAMPLE 3

One part of the color concentrate of Example 1 was tumble blended with 99 parts of Amoco polystyrene resin grade R5C7, placed in the hopper of a conventional laboratory scale injection molding machine, and molded into ⅛ in. thick panels. No screw slippage was observed. The molded panels had a uniform color, without visible specks or streaks.

EXAMPLES 4-11

Examples 4-11 illustrate the use of a polybutene-based liquid colorant vehicle with a variety of different pigments. In each example, Amoco Chemicals Indopol H-1900 polybutene and Emersol 213 oleic acid were dissolved in Magiesol M-52 light hydrocarbon oil, in the proportions indicated in Table I. After the vehicle components were blended, the pigment indicated in Table I was added under agitation, and the mixture was then dispersed at high speed, usually for about 30 minutes, until a uniform, stable dispersion was achieved. In each case, 1 part of color concentrate was tumble blended with 99 parts of Shell polypropylene resin 5824S, placed in the hopper of a conventional laboratory scale injection molding unit, and molded into ⅛ in. thick panels. No screw slippage was observed, and the molded panels had a uniform color, with no visible specks or streaks.

TABLE I

| Ex. No. | Pigment Type & Source | Pigment Parts | Polybutene Parts | Oil Parts | Oleic Acid Parts | Brook.* Visc. cp |
|---|---|---|---|---|---|---|
| 4 | Carbon Black/ Columbian/Carbon Raven 1255 | 15.00 | 40.37 | 40.38 | 4.25 | 25,000 |
| 5 | Phthalocyanine Blue/Sun Chemical 249-1282 | 20.00 | 38.00 | 38.00 | 4.00 | 17,400 |
| 6 | Phthalocyanine Green/ Basf L-8730 | 27.50 | 34.43 | 34.43 | 3.63 | 21,200 |
| 7 | Diarylide Yellow-AAMX/ American Hoechst 11-1300 | 17.50 | 39.19 | 39.19 | 4.12 | 18,200 |
| 8 | Chrome Yellow/ DuPont Y 469D | 65.00 | 16.62 | 16.63 | 1.75 | 30,400 |
| 9 | Moly Orange/ DuPont YE421D | 62.50 | 17.81 | 17.81 | 1.88 | 24,000 |
| 10 | Red Iron Oxide/ Columbian #297 Red Oxide | 50.00 | 23.75 | 23.75 | 2.50 | 23,600 |
| 11 | Quinacridone Violet/ DuPont RT-201D | 22.50 | 36.81 | 36.81 | 3.88 | 16,400 |

*Spindle #4, 10 rpm, room temperature.

EXAMPLES 12-19

In Examples 12-19, white and black color concentrates were formulated in the indicated proportions by dissolving the addition polymer and Emersol 213 oleic acid in the solvent, then adding the pigment under agitation, and dispersing the pigment at high speed until a uniform, stable dispersion was achieved, usually in about 30 minutes. The white pigment was DuPont R-900 titanium dioxide. The black pigment was Columbian Carbon Raven 1255.

Nine (9) parts of the white color concentrate and 1 part of the black color concentrate were then mixed to form a mixed color concentrate. One (1) part of the mixed concentrate was tumble blended with 99 parts of Shell polypropylene resin 5824S, and molded into ⅛ in. thick panels in a conventional laboratory scale injection molding machine. No screw slippage was observed in any of these examples, and all of the molded panels had a uniform color with no visible specks or streaks.

EXAMPLE 12

The white colorant was formulated from 19.0 parts Amoco Indopol H-1900 polybutene, 19.0 parts Witco Chemical No. 40 mineral oil, 2.0 parts oleic acid, and 60.0 parts titanium dioxide.

The black colorant was made from 40.37 parts of the same polybutene, 40.38 parts of Witco #40 mineral oil, 4.25 parts of oleic acid, and 15.0 parts of carbon black.

EXAMPLE 13

The white colorant was made from 22.0 parts of Hercules Piccolastic A50 polystyrene (average molecular weight about 300-400), 16.0 parts of Magiesol M-52, 2.0 parts of oleic acid, and 60.0 parts of titanium dioxide. The Brookfield viscosity of the colorant was 17,600 centipoises.

The black colorant was made from 46.75 parts of the same polystyrene, 34.00 parts of Magiesol M-52, 4.25 parts of oleic acid, and 15.00 parts of carbon black. The Brookfield viscosity of the colorant was 5,600 centipoises.

EXAMPLE 14

The white colorant was made from 19.0 parts of Hercules Piccotex 100, a poly alpha-methyl styrene/vinyl toluene resin, 19.0 parts of Magiesol M-52, 2.0 parts of oleic acid, and 60.0 parts of titanium dioxide.

The black colorant was made from 40.37 parts of Hercules Piccotex 100, 40.38 parts of Magiesol M-52, 4.25 parts of oleic acid, and 15.0 parts of carbon black.

EXAMPLE 15

The white colorant was made from 19.0 parts of Amoco Indopol H-1900 polybutene, 19.0 parts of di-octyl adipate, 2.0 parts of oleic acid, and 60.0 parts of titanium dioxide.

The black colorant was made from 40.37 parts Indopol H-1900 polybutene, 40.38 parts of di-octyl adipate, 4.25 parts of oleic acid, and 15.0 parts of carbon black.

EXAMPLE 16

The white colorant was made from 19.0 parts of Hercules Piccolastic A75 polystyrene, 19.0 parts of di-octyl adipate, 2.0 parts of oleic acid, and 60.0 parts of titanium dioxide.

The black colorant was made from 40.37 parts of Piccolastic A75, 40.38 parts of di-octyl adipate, 4.25 parts of oleic acid, and 15.0 parts of carbon black.

EXAMPLE 17

The white colorant was made by mixing 19.0 parts of the poly-alpha-methyl styrene/vinyl toluene resin used in Example 14, 19.0 parts of di-octyl adipate, 2.0 parts of oleic acid, and 60.0 parts of titanium dioxide.

The black colorant was made by mixing 40.37 parts of the same poly-alpha-methyl styrene/vinyl toluene resin, 40.38 parts of di-octyl adipate, 4.25 parts of oleic acid, and 15.0 parts of carbon black.

EXAMPLE 18

The white colorant was made by mixing 11.4 parts of a polymethylmethacrylate resin having a molecular weight of about 8000, 26.6 parts of di-octyl adipate, 2.0 parts of oleic acid, and 60.0 parts of titanium dioxide. Its Brookfield viscosity was 22,800 centipoises.

The black colorant was made by mixing 24.22 parts of the same acrylic resin, 56.53 parts of di-octyl adipate, 4.25 parts of oleic acid, and 15.0 parts of carbon black. Its Brookfield viscosity was 8,400 centipoises.

EXAMPLE 19

The white colorant was made from 15.2 parts of Amoco H-1900 polybutene, 22.8 parts of di-isodecyl phthalate, 2.0 parts of oleic acid, and 60.0 parts of titanium dioxide.

The black colorant was made from 32.3 parts of the same polybutene, 48.45 parts of di-isodecyl phthalate, 4.25 parts of oleic acid, and 15.0 parts of carbon black.

EXAMPLE 20

This example illustrates the use of the liquid vehicle of this invention as a carrier for a chemical blowing agent. A solution was formed from 23.75 parts of Amoco H-1900 polybutene, 23.75 parts of Magiesol M-52, and 2.5 parts of oleic acid at room temperature. To this mixture, there was added 50.0 parts of Uniroyal Celogen OT blowing agent, under agitation. This mixture was then mixed at high speed until a uniform, stable dispersion was achieved. The Brookfield viscosity of this dispersion was 25,000 centipoises.

EXAMPLE 21

This example illustrates the use of the liquid vehicle of this invention as the carrier for an inert extender. A solution was formed from 16.62 parts of Amoco H-1900 polybutene, 16.63 parts of Magiesol M-52, and 1.75 parts of oleic acid at room temperature. To this solution, there was added 65.0 parts of Thompson-Weinman Atomite Calcium Carbonate, under agitation. This was mixed at high speed until a uniform stable dispersion was achieved. The Brookfield viscosity of this dispersion was 28,200 centipoises. This dispersion was blended with an equal amount of a black colorant concentrate made in accordance with Example 4, tumble blended with polypropylene (1 part in 99 parts polypropylene) and molded in a laboratory scale injection molding machine. No screw slippage was observed, and the molded panels had a uniform color, with no visible specks or streaks.

EXAMPLE 22

Examples 1 and 4 were repeated with Chevron #122 polybutene in place of the Amoco polybutene. The viscosity of the white colorant was 23,800 centipoises, and the viscosity of the black colorant was 30,000 centipoises. These two colorants were blended and molded as in Examples 12–19. No screw slippage was observed during molding. The molded panels had a uniform color with no visible specks or streaks.

We claim:

1. A liquid colorant dispersion for plastics comprising:
    (a) from about 15 percent to about 90 percent by weight of a colorant;
    (b) from about 5 percent to about 50 percent by weight of a polybutene having an average molecular weight between about 1000 and 3500; and
    (c) from about 5 percent to about 70 percent by weight of an essentially non-volatile solvent for the polybutene;
   wherein the dispersion has a viscosity between about 1,000 and 40,000 centipoises.

2. The dispersion of claim 1 wherein the polybutene has an average molecular weight between about 2100 and 2700.

3. A liquid colorant dispersion for plastics comprising:
    (a) from about 15 percent to about 90 percent by weight of a colorant;
    (b) from about 5 percent to about 50 percent by weight of a polystyrene having an average molecular weight between about 300 and 1000; and
    (c) from about 5 percent to about 70 percent by weight of an essentially non-volatile solvent for the polystyrene;
   wherein the dispersion has a viscosity between about 1,000 and 40,000 centipoises.

4. A liquid colorant dispersion for plastics comprising:
    (a) from about 15 percent to about 90 percent by weight of a colorant;
    (b) from about 5 percent to about 50 percent by weight of a copolymer comprising alpha-methyl styrene and vinyl toluene; and (c) from about 5 percent to about 70 percent by weight of an essentially non-volatile solvent for the copolymer;

wherein the dispersion has a viscosity between about 1,000 and 40,000 centipoises.

5. A liquid colorant dispersion for plastics comprising:
- (a) from about 15 percent to about 90 percent by weight of a colorant;
- (b) from about 5 percent to about 50 percent by weight of a polymer comprising methylmethacrylate having an average molecular weight between about 5,000 and 10,000; and
- (c) from about 5 percent to about 70 percent by weight of an essentially non-volatile solvent for the polymer;

wherein the dispersion has a viscosity between about 1,000 and 40,000 centipoises.

6. A liquid colorant dispersion for plastics comprising:
- (a) from about 15 percent to about 90 percent by weight of a colorant;
- (b) from about 5 percent to about 50 percent by weight of a polymer comprising isobutyl methacrylate having an average molecular weight between about 5,000 and 10,000; and
- (c) from about 5 percent to about 70 percent by weight of an essentially non-volatile solvent for the polymer;

wherein the dispersion has a viscosity between about 1,000 and 40,000 centipoises.

7. A liquid colorant dispersion for plastics comprising:
- (a) from about 15 percent to about 90 percent by weight of a colorant;
- (b) from about 5 percent to about 50 percent by weight of a polymer comprising 2-ethyl hexyl acrylate having an average molecular weight between about 5,000 and 10,000; and
- (c) from about 5 percent to about 70 percent by weight of an essentially non-volatile solvent for the polymer;

wherein the dispersion has a viscosity between about 1,000 and 40,000 centipoises.

8. The dispersion of claims 1, 2, 3, 4, 5, 6, or 7 wherein the solvent is a light oil having a boiling point of at least 450° F.

* * * * *